Aug. 25, 1953  H. B. CALDWELL ET AL  2,649,842
FLUID PRESSURE MOTOR COMPRISING RELATIVELY
EXTENSIBLE AND CONTRACTIBLE PISTON
AND CYLINDER ELEMENTS
Filed Aug. 9, 1948  3 Sheets-Sheet 1
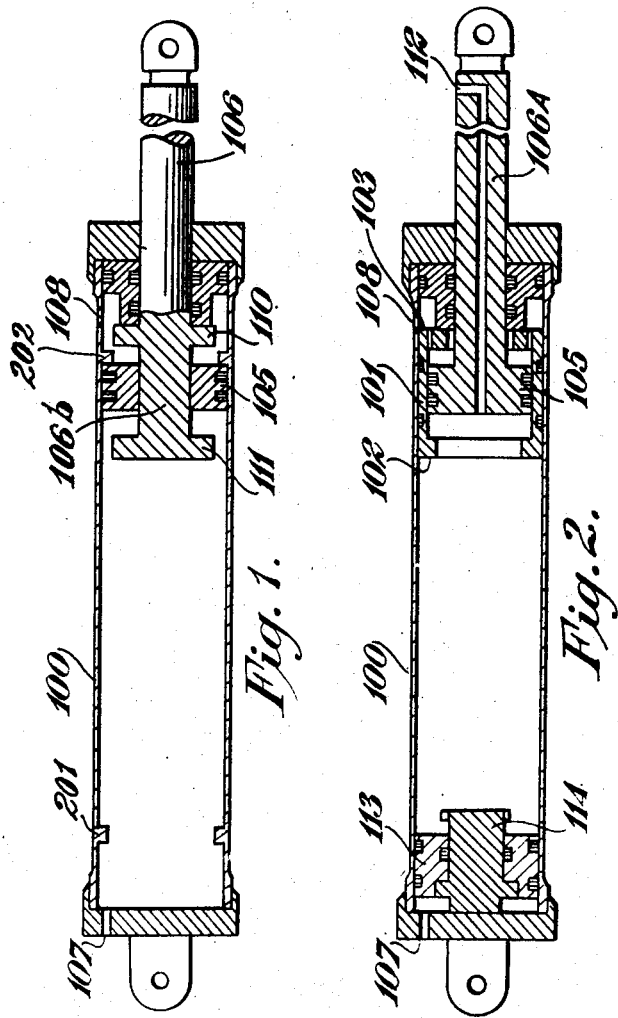

Aug. 25, 1953 H. B. CALDWELL ET AL 2,649,842
FLUID PRESSURE MOTOR COMPRISING RELATIVELY
EXTENSIBLE AND CONTRACTIBLE PISTON
AND CYLINDER ELEMENTS
Filed Aug. 9, 1948 3 Sheets-Sheet 2
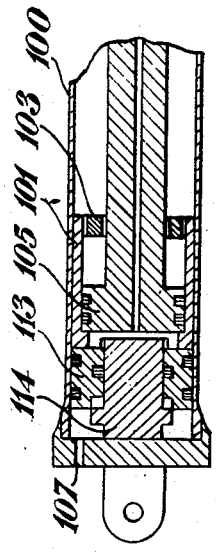
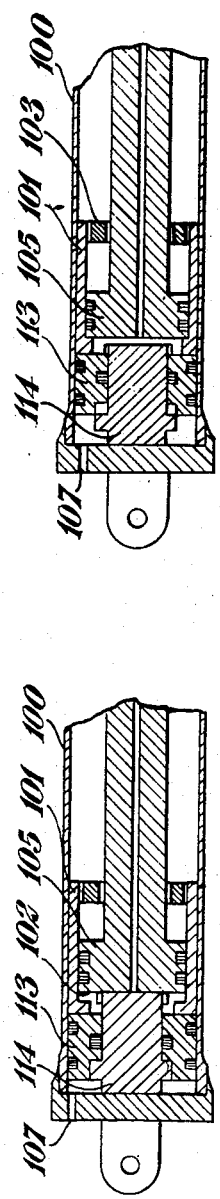
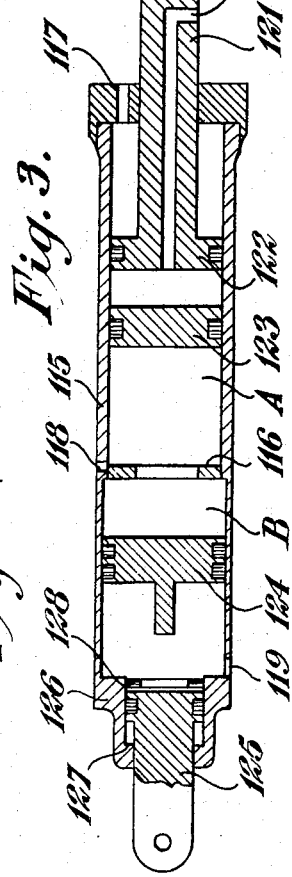
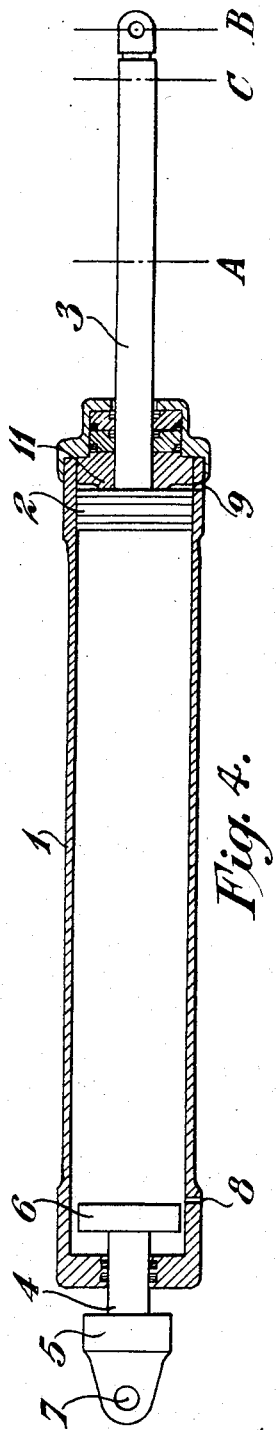
Inventors:
Harry Balshaw Caldwell and
Kenneth George Hancock;
By Baldwin, Wight & Prevost, Attys

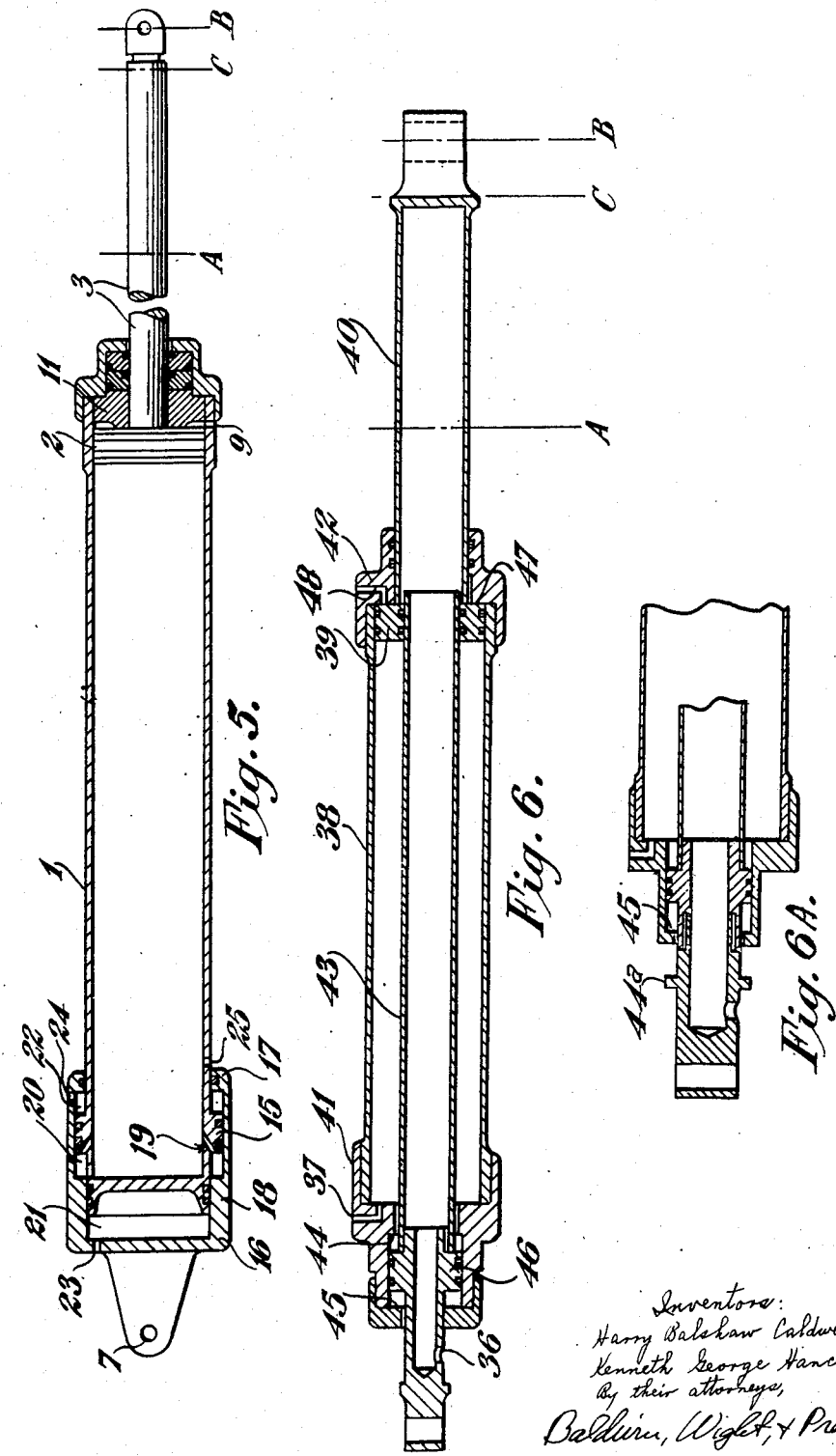

Patented Aug. 25, 1953

2,649,842

UNITED STATES PATENT OFFICE 2,649,842

FLUID PRESSURE MOTOR COMPRISING RELATIVELY EXTENSIBLE AND CONTRACTIBLE PISTON AND CYLINDER ELEMENTS

Harry Balshaw Caldwell, Penketh, Warrington, and Kenneth George Hancock, Great Sankey, near Warrington, England, assignors to Electro-Hydraulics Limited, Warrington, England, a company of Great Britain Application August 9, 1948, Serial No. 43,306
In Great Britain May 16, 1947

3 Claims. (Cl. 121—44)

This invention relates to fluid pressure operated motors comprising relatively extensible and contractible piston and cylinder elements including hydraulically or pneumatically operated motors suitable for use with retractable undercarriages, flaps, bomb doors, undercarriage doors, radiator shutters and other components in aircraft. The object of this invention is to provide a means of limiting the compression or tension effort which such a motor can exert over the last movement of travel to the extended or closed position, but which will allow the motor to exert its greatest effort, if required, during the other part of its travel; the invention is thus particularly applicable when the motor, which the motor moves, comes to rest against external stops before the motor has been fully extended or closed, so that the full effort, which the motor is capable of exerting, is not applied by the motor as a strut or tension effort nor to the various attachments and stops which would otherwise necessitate an exceptionally strong construction to withstand such loads.

A pressure operated motor according to the present invention for moving an object from one position of rest to another against external stops comprises a cylinder and piston so formed that the effective pressure-operative area of the piston is greater during the major portion of its movement than when it approaches the end of its travel, when the object is about to contact one of the stops.

In order to obtain the greater effective pressure operative area of the piston during the major portion of its movement the cylinder may be provided internally with a sleeve free to slide within the cylinder and formed with two abutment surfaces between which the piston can move, so that at the ends of movement of the piston the pressure operative area is provided by the annular or smaller piston face, thus limiting the compression and tension effort which the motor can exert.

In an alternative form the cylinder may be provided with an auxiliary piston rod member provided with stops, the cylinder and piston rod member being capable of relative movement between said stops and forming the pressure operative area as the piston approaches the end of its travel to limit the compression effort which the motor can exert.

Various forms of the invention are illustrated diagrammatically in the accompanying drawings in which Figure 1 is a longitudinal section of one form. Figure 2 shows an alternative form in longitudinal section, whilst Figures 2A and 2B are detail views thereof. Figures 3, 4, 5 and 6 are sectional views of other modified forms and Figure 6A a detail view of part of Figure 6.

Referring to the drawings, in Figure 1 is shown a construction in which the motor comprises a cylinder 100, provided with two internal ring faces or flanges 201, 202, the cylinder being pivotally attached to a fixed point. Arranged within the cylinder is a main piston 105, slidably mounted on an extension 106b of a piston rod 106. The latter passes out through the end of the cylinder remote from that pivotally attached to a fixed point, the piston rod being attached to the object to be moved. The piston rod extension 106b is formed with two abutments 110 and 111 which limit the travel of the piston 105 on the piston rod extension. Suitable seals are provided on the piston 105, so that fluid cannot pass from one side to the other, and at the piston rod end of the cylinder, so that fluid cannot escape to atmosphere. The cylinder is provided with two connections 107, 108 through either of which fluid under pressure may be supplied to the cylinder.

In order to extend the piston and cylinder assembly, fluid under pressure is admitted through the connection 107 to the cylinder, which pressure acts on the effective area of the abutment 111 which may be regarded as an auxiliary piston and on the main piston 105 to cause the piston and piston rod to be moved together until the piston 105 abuts against the ring 202, and so reaches the end of its travel. The arrangement is such that before the piston rod 106 reaches that intermediate point in its total travel at which the piston 105 reaches the end of its travel, the motor is allowed to exert its greatest effort, if required. Thereafter the auxiliary piston 111 moves relatively to the piston 105, so that the last part of the travel of the piston rod 106 is accomplished by fluid pressure acting only on the area of the abutment 111, which is less than the operative area of the piston 105. Movement of the piston rod 106 continues until it comes to rest against an external stop which may, for example, be a radius arm which is locked when the piston rod reaches its full travel, that is to say, a down-lock. The areas of the main piston 105 and piston rod 106 and abutment surfaces 110 and 111 may be so arranged that the effort exerted by the motor whilst the auxiliary piston 111 and piston rod 106 are moving relatively to the piston 105 is reduced to any convenient value. By this arrangement the compression effort which the motor can exert over the last movement of travel to the extended position is limited or reduced.

The piston rod 106 may be returned or retracted by applying fluid pressure through the connection 108 at the opposite end of the cylinder, so that the piston rod 106 and piston 105 move together until the piston 105 contacts the other ring 201 in the cylinder.

Referring now to the arrangement shown in Figures 2, 2A and 2B, this is a construction similar to Figure 1 but is adapted for operation in one direction, that is to say for extension, by an alternative source of pressure supply. In Figures 2, 2A and 2B the cylinder 100 contains a reciprocable floating sleeve 101 within which a piston 105 is slidably arranged. The piston 105 carries a piston rod 106A which extends outwardly through one end of the cylinder 100 and is provided with a fluid connection 112 which permits access of fluid under pressure from one source to the interior of the cylinder to cause extension of the motor. At the other end of the cylinder from the piston rod 106A there is provided another connection 107 by which fluid under pressure may be admitted from another source. Slidably arranged in the cylinder 100 between the connection 107 and the sleeve 101 is a floating sleeve 113 in which there is slidably mounted for reciprocation an auxiliary floating piston 114.

The position of the moving parts when the piston rod 106A is retracted is shown in Figure 2A. When fluid under pressure is admitted through connection 107 to extend the motor the floating sleeve 113 will move with respect to the cylinder 100 and the auxiliary piston 114 and carry with it the floating sleeve 101 so that the latter slides in respect to the cylinder 100 and the piston 105. This movement will continue until contact is made between the floating sleeve 113 and the stop on the inner end of the floating piston 114, or between the stop 102 on the sleeve 101 and the piston 105 whichever occurs first (see Figure 2B). Thereafter parts 113, 114, 101 and 105 move together with pressure acting on the full area of the cylinder bore until, after a predetermined amount of extension, the sleeve 101 comes to a stop, thus bringing to a stop the floating sleeve 113. Fluid pressure will now move the floating piston 114 to slide further to the right (see Figures 2A and 2B), carrying the piston 105 with it after contact has been made; thus over the last part of the extension of the motor piston, pressure is acting on the area of the floating piston 114 only, and over the other part, on the travel of the combined area of the floating piston 114 and floating sleeve 113, that is the area of the cylinder bore. When fluid pressure is applied through the connection 112 to extend the piston, or, through connection 108, to retract the piston, the motor works in the manner described with reference to Figure 1.

Referring to the arrangement shown in Figure 3 the motor consists of a cylinder 115 divided into two chambers by a fixed diaphragm or partition 116. In chamber A slides a piston 122 having a bored piston rod 121 and a floating piston 123. In the chamber B slides a floating piston 124. In the bore of the upper end fitting 126 is arranged an auxiliary piston 125 in fixed connection to the outer attachment lug of the motor. As will be seen the diaphragm 116 is ported. A fluid connection is provided at 118 so that if fluid pressure is admitted, the pressure will act on the floating pistons 123 and 124 simultaneously. Fluid can also be admitted through connections 117 and 119 and through a connection 120 which passes through the piston rod 121 of the piston 122 so as to enter the bore of the cylinder 115. The fluid connections 119 and 120 are coupled together so that fluid pressure is admitted and exhausted simultaneously at both connections.

When fluid pressure is admitted at 117, the cylinder 115 will move initially relatively to the auxiliary piston 125 until the stop 127 is reached by the auxiliary piston 125; then the piston 122 will move leftwards into the cylinder until it comes to a stop against the floating piston 123, which abuts against the diaphragm 116; the fluid pressure will then move the cylinder and with it the piston 122 relatively to the auxiliary piston 125 until the latter contacts stop 128.

To extend the piston, fluid pressure is admitted simultaneously through the connections 119 and 120. Pressure through the connection 120 passes through the bore of the piston rod 121 and piston 122 to move the sliding piston assembly to the right, fluid behind the piston being exhausted through connection 117. At the same time fluid pressure through the connection 119 will act on the auxiliary piston 125. Due to external load and the small area of the piston 125 the said piston will be held onto the stop 128 until the outward movement of the piston 122 comes to a pre-determined stop. Further extension of the motor with a smaller load will then be effected by the travel of the auxiliary piston 125 between the stops 128 and 127.

Fluid pressure from another source of supply can be admitted at connection 118 to extend the motor. This pressure will act simultaneously on the floating pistons 123 and 124. The floating piston 123 will carry the piston assembly 121 and 122 with it, and the floating piston 124 will move the auxiliary piston 125 from the stop 128 against the stop 127. It will be appreciated that chamber A comprises the closing and retracting part of the motor, and chamber B the load limiting part, also that the alternative source of supply provides in some cases fluid under a lower pressure than the normal supply so that it is not necessary to extend the motor with a load limiting device.

Thus should load limiting be desired for extension with normal and alternative pressures, the diameter of the chamber B can be made smaller than the diameter of the chamber A, the diaphragm 116 thus abutting against a shoulder formed between the difference in diameters so that when fluid pressure is admitted at 118 it will act on the floating piston 123 carrying the floating piston assembly until it reaches a pre-determined stop. Due to the smaller area this pressure acts on, the floating piston 124 will carry the auxiliary piston 125 off its stop after the floating piston 123 has reached its stop.

In an alternative form shown in Figure 4 the motor comprises a cylinder 1 in which a piston 2 and piston rod 3 are free to slide, whilst at the end of the cylinder remote from the piston rod and passing into the cylinder is an auxiliary piston rod member 4 provided with two shoulders 5, 6 spaced any convenient distance apart, one within and one without the cylinder, which is free to slide between said shoulders. The auxiliary piston rod 4 is pivotally attached at 7 to a fixed point, the main piston rod 3 being attached to the object to be moved. Again suitable seals are incorporated to prevent leakage of pressure fluid from one side of the piston to the other and to prevent leakage to atmosphere between the cylinder and main piston rod and between the cylinder and the auxiliary piston rod.

Fluid under pressure is allowed to enter the cylinder through a connection 8, which pressure causes relative movement between the auxiliary piston rod 4 and cylinder 1 until contact is made between the cylinder 1 and the external stop 5 on the auxiliary piston rod provided that the cylinder is not already in this position. Thereafter pressure acts on the full area of the main piston 2 producing a force which extends the motor, until the main piston abuts against a stop 11 in the remote end of the cylinder during which time the piston rod 3 has moved from its initial point A to an intermediate point C of its travel approaching the end thereof. The final movement of the piston rod from C to B is effected by fluid pressure acting between the cylinder 1 and auxiliary piston rod 4 causing the cylinder to slide with respect thereto until it approaches or contacts the inner stop 6 on the auxiliary piston rod, at which time the motor becomes fully extended so that during the last movement of travel to the extended position the compression effort which the motor can exert is limited. If desired to return the piston, fluid pressure may be applied through a connection 9.

In another alternative form illustrated in Figure 5 the cylinder 1 is provided with an external shoulder 15 sliding within an end fitting including a hollow auxiliary piston rod 16 provided with two abutment surfaces 17, 18, limiting the relative movement between the cylinder 1 and the auxiliary piston rod 16. The end of the cylinder which slides in the end fitting comprising the auxiliary piston rod is closed except for a small hole 19 which permits fluid under pressure to enter the annular space 20 between the cylinder and the abutment surfaces, whilst suitable sealing rings are provided so that leakage cannot occur from this annular space, suitable breathing holes 23, 24 being provided so that air is not trapped in the spaces 21, 22. Again suitable sealing rings are incorported on the piston so that fluid cannot flow from one side to the other, and on the piston rod end of the cylinder so that fluid cannot leak to atmosphere.

Hydraulic pressure is applied at connection 25, which by acting on the full area of piston 2 produces a force which extends the piston. At the instant pressure is applied at connection 25, the cylinder slides in the end fitting 16 until the shoulder 18 on the end fitting is in contact with the shoulder 15, provided that the shoulders are not already in contact. It is arranged that when the piston rod has moved from point A to some intermediate point C, the piston 2 meets the stop 11 on the cylinder, and thereafter movement from C to B is accomplished by hydraulic pressure acting on the annular area of the shoulder 15, the cylinder 1, piston 2 and piston rod 3 moving together.

In a further modified form as shown in Figures 6 and 6A the motor comprises a cylinder 38 in which a piston 39 and a hollow piston rod 40 are free to slide. The cylinder 38 is closed at one end by an end fitting 42 through which the piston rod 40 slides. At its other end it is closed by an end fitting 41 which constitutes an extension of the cylinder, and has a bore in which an auxiliary piston 46 is free to slide. The auxiliary piston has fixed thereto at one end an attachment eyebolt, and on the other end a hollow tube 43. The stroke of the auxiliary piston 46 is limited by shoulders 44, 45 as illustrated in Figure 6, or by shoulder 45 and a shoulder 44a on the eyebolt, as shown in Figure 6A. A pressure fluid connected 48 is provided in the end fitting 42, whilst there is also a pressure fluid connection 37 in the end fitting 41. A main piston 39 carried by the hollow piston rod 40 slides in the cylinder 38. The end fitting 42 also provides a stop 47 for limiting the outward movement of the piston rod 40 and piston 39 carried thereby.

On application of pressure fluid through connection 37, the cylinder 38 moves first to the left until contact is made between the abutment 44 and the auxiliary piston 46, provided such contact is not existing already. The pressure acting on the annular area of the piston 39 then forces it and the piston rod 40 to the right, producing the maximum effort and extending the piston rod 40. After the piston rod 40 has moved from its initial point A (its closed position) to an intermediate point C, the main piston 39 contacts the stop 47 at the end of the cylinder, and the final extending movement of the piston rod 40 to point B is accomplished by pressure fluid moving the cylinder 38, piston 39 and rod 40 to the right until the auxiliary piston 46 contacts the stop 45. The piston rod 40 may also be extended by admission of fluid pressure, preferably from another source of fluid pressure at the opening 36. Pressure fluid will then pass through the bore of the auxiliary piston 46, the bore of tube 43, and the bore of piston rod 40 to extend the latter.

The piston rod 40 can be retracted by supplying pressure fluid through the connection 48 so as to act on the annular area of the piston 39 to move it and the piston rod 40 to the left.

Figure 6A differs only from Figure 6 in that the position of the stop which limits movement of auxiliary piston 46 in one direction is changed from a shoulder 44 on the end fitting 41 to a shoulder 44a on the eyebolt; apart from this there is no functional difference.

What we claim is:

1. In a fluid pressure motor, a cylinder; a first piston reciprocable therein; a piston rod fast with said first piston and extending through one end of said cylinder; a cylinder part at the opposite end of said cylinder of smaller diameter than the cylinder part in which said first piston is reciprocable; a second piston reciprocable in said smaller diameter cylinder part; abutments for limiting the reciprocation of said second piston relative to said cylinder; an apertured partition on said cylinder between said first and second pistons, the diameter of said cylinder between said partition and said second piston being greater than the diameter of said cylinder between said partition and said first piston; a first floating piston reciprocable in said cylinder between said partition and said first piston; a second floating piston reciprocable in said cylinder between said partition and said second piston; and means for admitting pressure fluid to and discharging it from the spaces respectively between said first piston and the adjacent end of the cylinder, between said first piston and said first floating piston, between said first floating piston and said partition, and between said second piston and said second floating piston.

2. In a fluid pressure motor, a cylinder; a first piston reciprocable therein; a hollow piston rod fast with said first piston and extending through one end of said cylinder; separate means for admitting pressure fluid to and discharging it from said cylinder between said first piston and the respective ends of said cylinder; a reduced diameter cylinder portion at the opposite end of said cylinder; shoulders at the opposite ends of said cylinder portion; a second and hollow piston reciprocable in said cylinder portion within limits determined by said shoulders and having a part extending through the outer end of said cylinder portion; a tube fast with said second piston and extending through said cylinder and slidable through said first piston and communicating with the interior of said second piston and with said hollow piston rod; and means for admitting pressure fluid to and discharging it from said hollow piston.

3. In a fluid pressure motor, a cylinder; a main piston relatively reciprocable in said cylinder having a rod extending through one end to the outside thereof; an auxiliary piston reciprocable relatively to both said cylinder and said main piston and being spaced from said main piston longitudinally of said cylinder, said main and auxiliary pistons having different effective areas exposed for action thereon by fluid pressure in said cylinder and being movable by said pressure in opposite directions; means for transmitting effort due to relative movement of said cylinder and opposite direction movements of said pistons; and means for limiting movement of one of said pistons relatively to said cylinder before the end of the coacting movement of the other piston so that when said one of said pistons is stopped by said limiting means, the other of said pistons will continue its movement in deceleration of the stroke while exerting an effort different from the effort exerted prior to stopping of said one of said pistons.

HARRY BALSHAW CALDWELL.
KENNETH GEORGE HANCOCK.

References Cited in the file of this patent

UNITED STATES PATENTS

| Number | Name | Date |
|---|---|---|
| 787,479 | Tanner | Apr. 18, 1905 |
| 787,480 | Tanner | Apr. 18, 1905 |
| 2,259,576 | MacMillin | Oct. 21, 1941 |
| 2,464,962 | Bent | Mar. 22, 1949 |
| 2,485,805 | Bent | Oct. 25, 1949 |

FOREIGN PATENTS

| Number | Country | Date |
|---|---|---|
| 679,260 | Germany | Aug. 1, 1939 |